No. 798,188. PATENTED AUG. 29, 1905.
T. J. KEHOE.
VARIABLE SPEED CLUTCH MECHANISM.
APPLICATION FILED AUG. 29, 1904.

2 SHEETS—SHEET 2.

WITNESSES:

INVENTOR
Thomas J. Kehoe
BY
ATTORNEY

UNITED STATES PATENT OFFICE.

THOMAS J. KEHOE, OF FORT WAYNE, INDIANA, ASSIGNOR, BY DIRECT AND MESNE ASSIGNMENTS, TO WAYNE GEAR AND MACHINE COMPANY, A CORPORATION OF INDIANA.

VARIABLE-SPEED CLUTCH MECHANISM.

No. 798,188.     Specification of Letters Patent.     Patented Aug. 29, 1905.

Application filed August 29, 1904. Serial No. 222,497.

*To all whom it may concern:*

Be it known that I, THOMAS J. KEHOE, a citizen of the United States of America, and a resident of Fort Wayne, in the county of Allen and State of Indiana, have invented certain new and useful Improvements in Variable-Speed Clutch Mechanism, of which the following is a specification.

This invention relates to improvements in variable-speed clutch mechanism; and the objects thereof are, first, to provide suitable clutch mechanism to be controlled by a single lever and which will effect working engagements severally with the various moving parts of the driving-gear, and, second, to provide means to ease the shock occasioned by the engagement of the several clutch-dogs with the corresponding driving parts.

I accomplish these objects by the construction illustrated in the accompanying drawings, in which—

Figure 1:
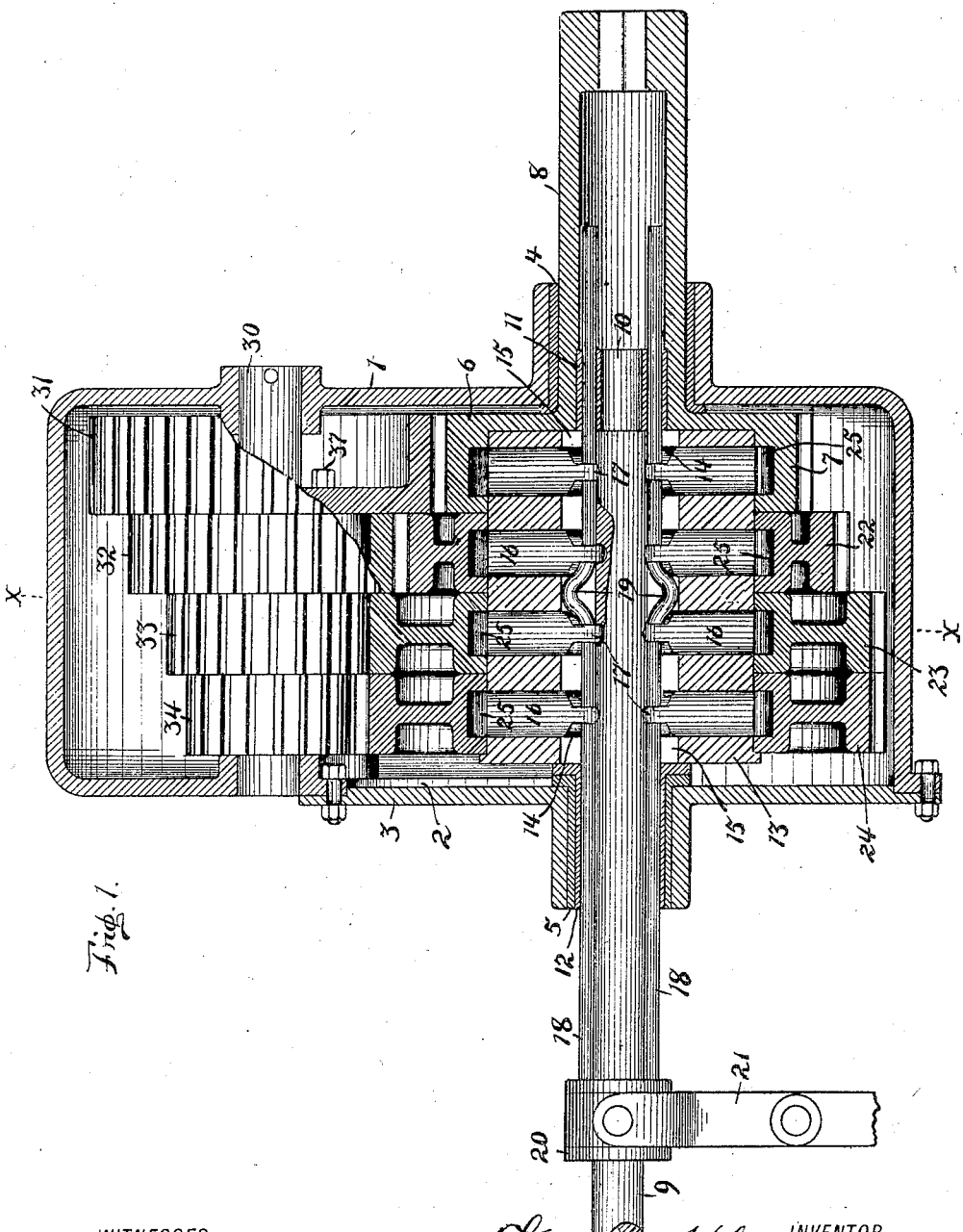
Figure 2:
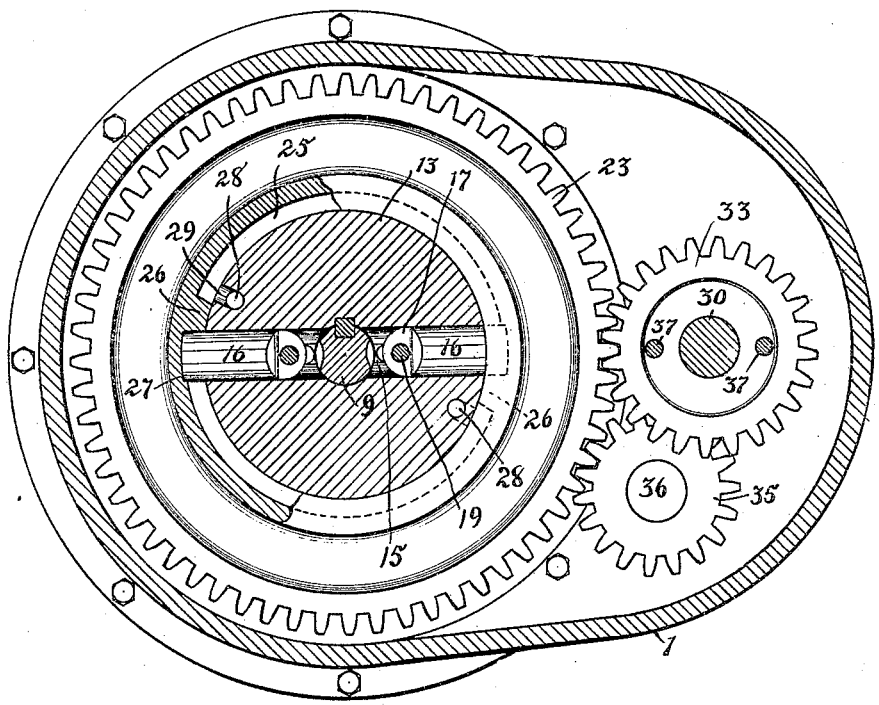

Figure 1 is a partial horizontal central section showing the relative arrangement of parts, and Fig. 2 is a transverse section of the clutch member and transmission-shaft on the line *x x* of Fig. 1 and showing also one of the loose gears partly cut away.

Similar numerals of reference indicate corresponding parts in both views.

This construction consists of a gear-case 1, having an opening 2, which is covered by a head 3. In the case 1 and head 3 are suitable bearings 4 and 5, respectively, the axial centers of which are in alinement. A driving-gear 6, having a toothed flange 7, is arranged within said case and has also a tubular journal 8, which ranges in said bearing 4. A transmission-shaft 9 is arranged in line with the axis of the journal 8 and has upon its end 10 a fixed bushing 11, which extends into said tubular journal and receives support therein. The shaft 9 has also a fixed bushing 12, which ranges in the bearing 5 and is adapted to turn, together with said shaft, therein. A clutch member 13 is rigidly mounted upon the transmission-shaft 9 at a point within said case and between said bushings. A series of radial openings 14 are made in said clutch member and range in diametrically opposite pairs, and longitudinal slots 15 are made in said clutch member adjacent the transmission-shaft and intersecting said openings 14 at the inner ends thereof. In each of said openings is arranged an outwardly-movable dog 16, which has an inwardly-extending lug 17. Operating-rods 18 are arranged parallel with the transmission-shaft 9 upon diametrically opposite sides thereof and extend through the said bushings 11 and 12 and are supported thereby. The said rods 18 are also arranged in said slots 15, respectively, and extend loosely through the lugs 17 of the corresponding dogs 16. Outwardly-disposed crooks 19 are made in said operating-rods 18, which are adapted to glide longitudinally in said slots 15 and engage said dogs severally in opposite pairs and move the same outwardly when said operating-rods are accordingly shifted lengthwise respecting the clutch member 13. The rods 18 are attached at their outer ends with a sliding collar 20, which has in operating connection therewith a lever 21, by means of which motion is given to said operating-rods lengthwise. One end of said clutch member extends within the toothed flange 7 of the driving-gear 6, and the other part thereof has mounted loosely thereon a series of toothed rings 22, 23, and 24, respectively. Each of said toothed rings and also the flange 7 have internal grooves 25, and in each of said grooves are arranged diametrically opposite stops 26, adapted to engage the outer ends of the corresponding dogs 16 when the latter project into said grooves. A slight depression 27 is made at the bottom of each of said grooves at a point adjacent said stops, such as to receive the ends of said dogs, and thus prevent "backlash" of the engaged rings.

Longitudinal openings 28 are made in the clutch member 13, and suitable ports 29 will therefore register with the grooves 25 of the various rings and also of the flange 7, the purpose being to admit oil to said grooves.

A series of gears 31, 32, 33, and 34 are secured together by means of bolts 37 and are together mounted upon a shaft 30, which ranges parallel with the transmission-shaft and is rigidly fixed in the case 1. The gear 31 meshes with the driving-gear 6 and is driven thereby, and the gears 32, 33, and 34 are thereby actuated. The gears 32 and 33 mesh with the toothed rings 22 and 23, respectively, and an intermediate gear 35 is mounted within the case upon a suitable stud 36 and meshes with the gear 34 and toothed ring 24, and thereby the latter is driven in the opposite direction to that of the other toothed rings and driving-gear 6. Because of the variation in diameter of the various gears and the corresponding toothed rings the speed of the latter will vary accordingly, and the rotation of the transmission-shaft 9 will vary in speed and direction of rotation accordingly as the several pairs of dogs engage, respectively, said rings or driving-gear.

It is the intention that the case 1 shall contain oil and that the said grooves 25 shall become more or less filled with oil from said case, so that when the extending ends of the dogs approach the stops 26 the oil in said grooves will resist sudden contact between said dogs and stops.

The driving-gear 6 is actuated by applying power from any suitable source to the journal 8, and the transmission-shaft 9 may be coupled to any suitable mechanism to be driven.

Having described the invention, what I claim as new, and desire to secure by Letters Patent, is—

1. In mechanism of the class described, a transmission-shaft; a clutch member fixed on said transmission-shaft; a ring loosely mounted on said clutch member, having a groove in its inner side adapted to contain fluid; means to supply fluid to said groove; one or more stops carried by said ring and arranged transversely in said groove; one or more movable dogs arranged within the clutch member, and the outer ends of which are adapted to engage with said stops; and means to operate said dogs.

2. In mechanism of the class described, a clutch member; a driving-gear having a flange overhanging said clutch member, the said flange being provided in its inner side with a groove adapted to contain fluid; one or more stops carried by the gear and ranging transversely in said groove; means to supply fluid to said groove; and means carried by said clutch member adapted to be moved into said groove and engage said stops.

3. In mechanism of the class described, a transmission-shaft; a clutch member fixed upon said shaft; a ring loosely mounted upon said clutch member; a dog carried by said clutch member adapted to engage said ring; and an operating-rod extending through the inner end of the dog and having a crook by means of which said dog is actuated so as to engage said ring.

4. In mechanism of the class described, a transmission-shaft; a driving-gear having a flange; a clutch member fixed upon said shaft and extending within said flange; one or more movable dogs carried by said clutch member adapted to engage said gear; one or more slots in said clutch member parallel with the transmission-shaft; and one or more operating-rods ranging through the inner ends of said dogs, having outwardly-disposed crooks adapted to glide in said slots, respectively, and actuate the corresponding dogs.

5. In clutch mechanism of the class described, a rotatable ring having in its inner side a groove adapted to contain fluid; a stop arranged transversely in said groove; a rotatable shaft having in connection therewith means adapted to extend into said groove and engage said stop; and means for supplying fluid to the groove.

6. In clutch mechanism, a clutch member and a ring, one being movable relative to the other, combined with a dog, carried by the clutch member, which is adapted to engage said ring, and an operating-rod extending through the inner end of the dog, and having a crook to actuate the latter so as to engage said ring.

In testimony whereof I affix my signature in presence of two witnesses.

THOMAS J. KEHOE.

Witnesses:
M. J. BLITZ,
W. G. BURNS.